UNITED STATES PATENT OFFICE.

ISABELLA J. VAN SKELLINE, OF BROOKLYN, E. D., NEW YORK.

PROCESS OF DYEING TISSUE AND BONBON PAPERS.

SPECIFICATION forming part of Reissued Letters Patent No. 9,939, dated November 22, 1881.

Original No. 192,201, dated June 19, 1877. Application for reissue filed May 21, 1881.

*To all whom it may concern:*

Be it known that I, ISABELLA J. VAN SKELLINE, of Brooklyn, in the county of Kings and State of New York, have invented certain new and useful Improvements in Dyeing Ornamental Tissue-Paper for Commercial Purposes; and I do hereby declare that the following is a full, clear, and exact description thereof.

Heretofore it has been a matter of great difficulty, previous to my invention, to produce different shades of red, varying from a light-pink to a deep-scarlet or cherry color, in their proper purity, so as to give the best effect, the color produced by the ordinary process being dull and heavy, as well as expensive, rendering the finished article of comparatively little value for ornamental or trade purposes.

My invention is especially designed to overcome these objections; and it consists in a certain new and useful method of tinting wrappers or papers for confectionery uses, such as bonbons, motto-papers, and the like, by the application of resorcine or its bromated compounds—as fluorescein and eosine—either alone or combined with aurine, as may be desired to apply the said tint to paper, to vary the shades, as more fully specified hereinafter.

In carrying out my invention I take, preferably, a solution of eosine, made up of five or more parts of eosine, according to the depth of the shade to be produced in the finished article, and twelve parts, or thereabout, of water. In some cases, instead of water, the eosine, in about the proportions above mentioned, may be dissolved in about the same amount of a saturated solution of stannate or bromide of sodium or the diacetate of lead, zinc, or tin, in the same quantity, or thereabout, of water, as above mentioned. This forms the dyeing solution, which is applied by simply dipping the edges of the paper therein, leaving the center white, so that the coloring may not come in contact with the confectionery placed in such wrapper.

As my invention is designed particularly for tinting tissue-papers for bonbon-wrappers and the like, I will describe it more particularly with reference to the dyeing of the same.

I take the solution above described and place the same in a suitable vat or vessel. I then dip the edges of the papers or wrappers to be dyed therein, after they have been made up into ornamental sheets, until they have received or absorbed the desired tint, when, having received the requisite amount of coloring-matter, they may be immediately dried for use; or they may be submitted to treatment with astringent mordants, if it is desired to more permanently fix the dye. The said mordant is prepared of a mixed and saturated solution of alum and carbonate of ammonia, of one part each, or thereabout.

I do not intend to limit myself to the employment of eosine or the other aniline derivative coloring-matter known as "aurine," before mentioned, together or in combination with the salts above mentioned, or with the alkaline mordant, as such colors may be used to advantage separately to produce the different desired shades of color; nor do I claim in this application the article produced, as such is the subject-matter of a separate patent, granted me February 20, 1877, No. 187,495.

Having fully described my invention, what I claim, and desire to secure by Letters Patent, is—

1. The method or process of tinting bonbon wrapping-paper, which consists in applying as a main or central color a solution of a resorcine color, as fluorescein or its bromated compound eosine, treated or not with a mordant, as described.

2. The process, as described, for tinting and dyeing tissue-paper for bonbons and other like articles by treating the same with a solution of a resorcine compound, known as "eosine" or "bromated fluorescein," and the like, combined, when necessary, with the stannate of soda, potash, or the salts of lead, zinc, or tin, and subsequently with an alkaline astringent mordant, for the purposes set forth.

3. The method of applying resorcine or its bromo-fluorescein compound known as "eosine" or its equivalent aurine, to the tinting of bonbon-wrappers, motto-papers, &c., by confining said color to the edges of such paper, leaving the center of said paper of a white tint, for purposes set forth.

In testimony that I claim the foregoing I have hereunto set my hand this 28th day of April, 1881.

I. J. VAN SKELLINE.

Witnesses:

THEO. MUNGEN,

CHAS. L. COOMBS.